United States Patent
Ghasemazar et al.

(10) Patent No.: US 10,401,236 B2
(45) Date of Patent: Sep. 3, 2019

(54) DYNAMIC SENSOR ACCURACY SETTING THRESHOLD

(71) Applicant: QUALCOMM Incorporated, San Diego, CA (US)

(72) Inventors: Mohammad Ghasemazar, Long Beach, CA (US); Mohammad Meysam Zargham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 15/163,215

(22) Filed: May 24, 2016

(65) Prior Publication Data

US 2017/0343427 A1 Nov. 30, 2017

(51) Int. Cl.
*G01K 15/00* (2006.01)
*G01D 3/024* (2006.01)
*G01D 3/10* (2006.01)

(52) U.S. Cl.
CPC .......... *G01K 15/005* (2013.01); *G01D 3/024* (2013.01); *G01D 3/10* (2013.01)

(58) Field of Classification Search
USPC ..................................................... 374/1, 100
See application file for complete search history.

(56) References Cited

U.S. PATENT DOCUMENTS

| | | | |
|---|---|---|---|
| 7,317,943 B2 | 1/2008 | Ferek-Petric | |
| 8,032,334 B2 | 10/2011 | Bieswanger et al. | |
| 8,830,055 B2 | 9/2014 | Lynch et al. | |
| 2011/0257936 A1 | 10/2011 | Kulik et al. | |
| 2015/0131695 A1* | 5/2015 | Kobayashi | G01C 19/5776 374/1 |
| 2015/0142203 A1 | 5/2015 | Roth et al. | |
| 2015/0297078 A1 | 10/2015 | Gross et al. | |
| 2015/0316503 A1* | 11/2015 | Hoque | H01L 29/78 257/253 |

FOREIGN PATENT DOCUMENTS

| | | |
|---|---|---|
| DE | 102010064201 A1 | 6/2012 |
| EP | 2426462 A1 | 3/2012 |
| WO | 2013134925 A1 | 9/2013 |

OTHER PUBLICATIONS

International Search Report and Written Opinion—PCT/US2017/026845—ISA/EPO—dated Jul. 20, 2017.

* cited by examiner

*Primary Examiner* — Mirellys Jagan
(74) *Attorney, Agent, or Firm* — Arent Fox, LLP and Qualcomm, Incorporated (57) ABSTRACT

Apparatuses are presented. The apparatus includes a sensor configured with an adjustable accuracy setting to measure a physical parameter and a controller configured to adjust the accuracy setting based on a threshold, and to adjust the threshold based on the physical parameter measured by the sensor. Another apparatus includes a sensor configured with a plurality of sensor accuracy settings to measure a physical parameter of a circuit in a plurality of operating regions. The plurality of operating regions is based on ranges of the physical parameter measured by the sensor. Each of the plurality of sensor accuracy settings corresponds to one of the plurality of operating regions. A controller is configured to adjust one of the ranges of the physical parameter for one of the plurality of operating regions, in response to a change of an operating condition of the circuit.

14 Claims, 8 Drawing Sheets

DYNAMIC SENSOR ACCURACY SETTING THRESHOLD

BACKGROUND

Field

The disclosure relates to apparatuses with adjustable sensor accuracy settings and, in particular, to electronic apparatuses and integrated circuits (ICs) with dynamic sensor accuracy setting thresholds.

Background

Implementing sensors in an IC may be helpful in improving the performance of the IC in various ways. For example, temperature sensors may be placed in an IC for wireless communication to manage and to mitigate the heat generated by operations of the IC. Wireless communication technologies and devices (e.g., cellular phones, tablets, laptops, etc.) have grown in popularity and usage over the past decade. These electronic apparatuses have grown in complexity and now commonly incorporate multiple processors (e.g., baseband processor and/or application processor) and other ICs that allow the users to run complex and power intensive software applications (e.g., music players, web browsers, video streaming applications, etc.). To meet the increasing performance demands, these ICs have increased in complexity and operate at clock frequencies in the gigahertz range. As a result, substantial heat may be produced while operating these processors. The heat generated by the processors may affect performance and reliability of the device. For example, both performance and reliability of the IC may degrade when operating at high temperature. The temperature sensors help to manage the thermal issue by detecting hot spots on the IC to allow mitigation measures to keep the heat generated within a thermal ceiling.

However, the operations of the sensors, such as the aforementioned temperature sensors, consume power. On the other hand, operating in certain regions (e.g., the IC operating near the thermal ceiling) may need accurate temperature measurements for the mitigation measures to properly function. Thus, one design concern is how to balance the power consumption of the sensors and the accuracy needs of the IC.

SUMMARY

Aspects of an apparatus are disclosed. In one implementation, the apparatus includes a sensor configured with an adjustable accuracy setting to measure a physical parameter. A controller is configured to adjust the accuracy setting based on a threshold, and to adjust the threshold based on the physical parameter measured by the sensor.

Aspects of a method for measuring a physical parameter are disclosed. In one implementation, the method includes measuring the physical parameter by a sensor based on an accuracy setting, adjusting the accuracy setting based on a threshold, and adjusting the threshold based on the physical parameter measured by the sensor.

Aspects of another apparatus are disclosed. In one implementation, the apparatus includes a sensor configured with a plurality of accuracy settings to measure a physical parameter of a circuit in a plurality of operating regions. The plurality of operating regions is based on ranges of the physical parameter measured by the sensor. Each of the plurality of accuracy settings corresponds to one of the plurality of operating regions. A controller is configured to adjust one of the ranges of the physical parameter for one of the plurality of operating regions, in response to a change of an operating condition of the circuit.

Aspects of another method for measuring a physical parameter are disclosed. In one implementation, the method includes measuring the physical parameter of a circuit by a sensor with a plurality of accuracy settings in a plurality of operating regions. The plurality of operating regions is based on ranges of the physical parameter measured by the sensor. Each of the plurality of accuracy settings corresponds to one of the plurality of operating regions. The method further includes adjusting one of the ranges of the physical parameter for one of the plurality of operating regions, in response to a change of an operating condition of the circuit.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. The term "exemplary" is used herein to mean "serving as an example, instance, or illustration." Any design described herein as "exemplary" is not necessarily to be construed as preferred or advantageous over other designs.

Several aspects of the disclosure will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. Various apparatus and methods presented throughout this disclosure may be implemented in various forms of hardware. By way of example, any of these apparatus or methods, either alone or in combination, may be implemented as an integrated circuit, or as part of an integrated circuit. The integrated circuit may be an end product, such as a microprocessor, a digital signal processor (DSP), an application specific integrated circuit (ASIC), programmable logic, or any other suitable integrated circuit. Alternatively, the integrated circuit may be integrated with other chips, discrete circuit elements, and/or other components as part of either an intermediate product, such as a motherboard, or an end product.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of the stated features, integers, steps, operations, elements, and/or components, but do not preclude the presence or addition of one or more other features, integers, steps, operations, elements, components, and/or groups thereof.

Various aspects of apparatus and methods for dynamic adjustment of sensor accuracy settings are provided in the context of temperature sensors on a processor for wireless communication. However, as those skilled in the art will readily appreciate, aspects and applications of the disclosure may not be limited thereto. For example, the features presented may be applicable to other types of sensors, such as voltage sensors, and to other types of ICs beyond a processor. Further, the features presented may be applicable to functions beyond wireless communication as well. Accordingly, all references to a specific application for the presented apparatus or method are intended only to illustrate exemplary aspects of the apparatus or method with the understanding that such aspects may have a wide differential of applications.

Figure 1:
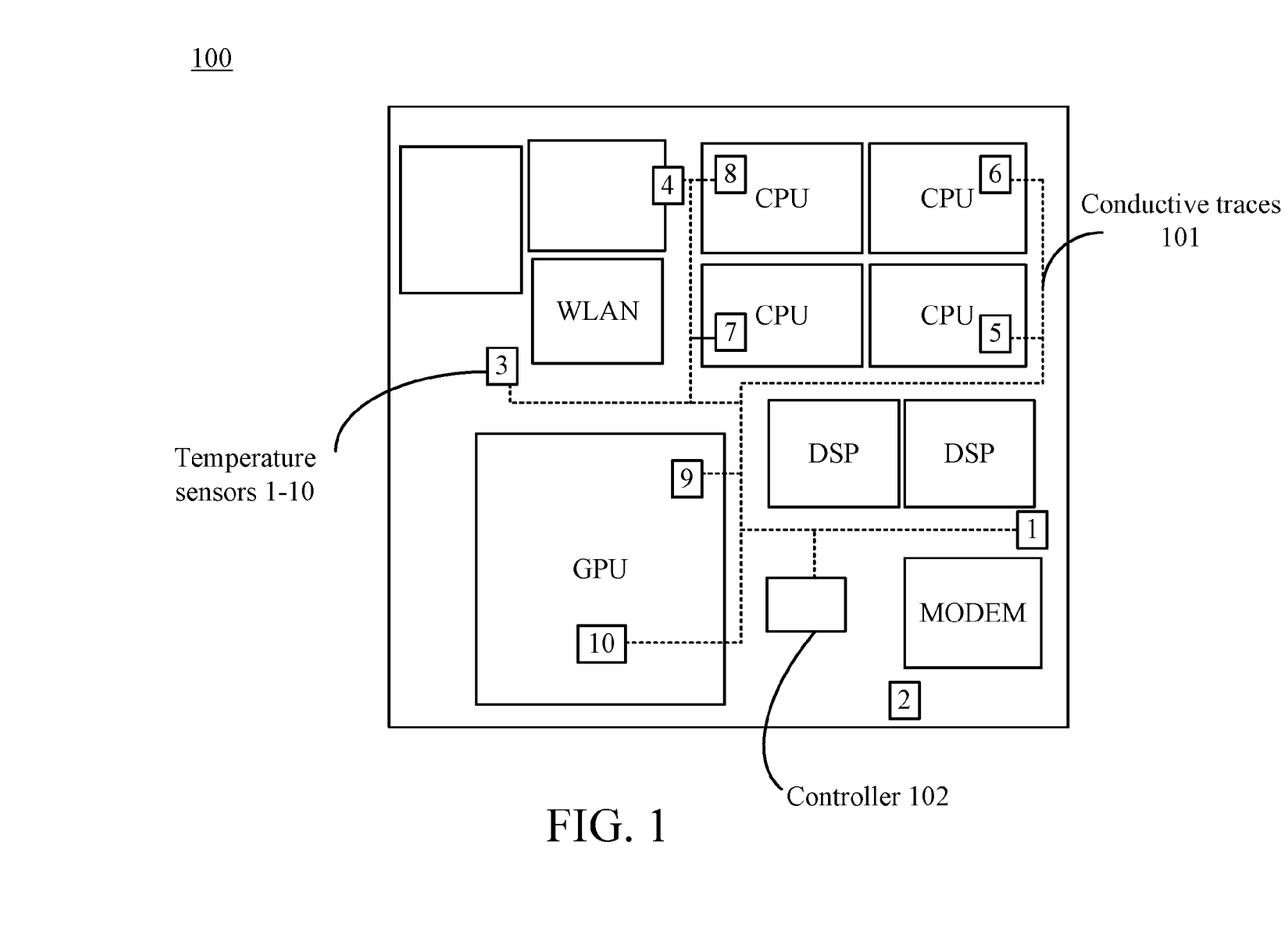
FIG. 1 is a diagram of an exemplary embodiment of a processor with temperature sensors.

FIG. 1 is a diagram of an exemplary embodiment of a processor with temperature sensors. The processor may be an IC on a discrete substrate, and may be referred to an IC 100. The processor (IC 100) may be a processor for wireless communication, such as an integrated application and baseband processor for a cell phone. The processor (IC 100) includes various cores or blocks of circuits, such as graphic processor unit (GPU), DSP, modem, central processing units (CPU), and a wireless local area network (WLAN) component. A core may be, for example, a collection of circuits.

The processor (IC 100) also includes various sensors to measure physical parameters. In some examples, the physical parameters may be temperature or voltage. For example, the processor (IC 100) includes temperature sensors 1-10 that detect or measure on-die temperatures of the processor (IC 100) and output the measured temperatures in periodic intervals (e.g., measuring the on-die temperatures at a sampling rate). The measured temperatures may be outputted to a controller 102 via the conductive trace 101. In some examples, the temperature sensors 1-10 measure temperatures of associated circuits. For example, the temperature sensor 3 may be placed near the WLAN component, and accordingly, the temperatures measured by the temperature sensor 3 may be based on operations of the WLAN component.

The controller 102 may receive the measured temperatures from the temperature sensors 1-10 via the conductive trace 101, and in some examples, the controller 102 may control the accuracy settings of the temperatures sensors 1-10 by outputting signaling on the conductive trace 101. Further details on the features to control and to adjust the accuracy settings of the temperatures sensors 1-10 are presented below. In some examples, the processor (IC 100) may, via the controller 102, operate various thermal mitigation functions on the cores in order to meet certain heat limitations (e.g., to prevent the cores from operating in or near thermal ceilings). The thermal mitigation functions may include reducing an operating frequency of a core, lowering an operating voltage of the core, and/or power-collapsing the core.

Figure 2:
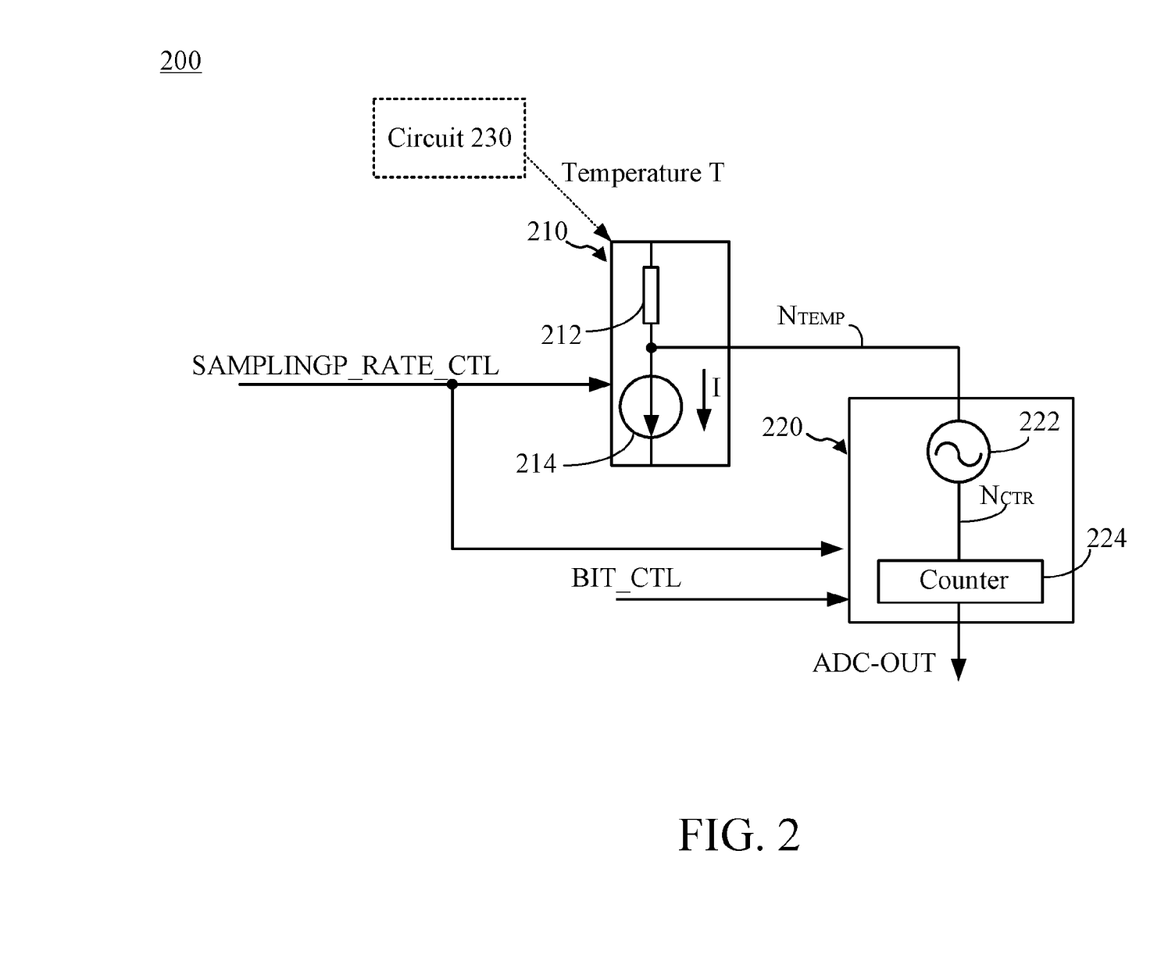
FIG. 2 is a diagram of an exemplary embodiment of a temperature sensor.

FIG. 2 is a diagram of an exemplary embodiment of a temperature sensor. The temperature sensor 200 (e.g., an instance of one of the temperature sensors 1-10) may include a temperature measurement circuit 210 and an analog-to-digital converter (ADC) 220. The temperature measurement circuit 210 may output a voltage at the node $N_{TEMP}$ proportional to the temperature T experienced by the temperature measurement circuit 210. The temperature T may be based on (e.g., corresponds to or generated by) the circuit 230. The circuit 230 may be considered as not a part of the temperature sensor 200.

Various designs for the temperature measurement circuit 210 are known in the art and may be used in the temperature sensor 200. In one configuration, the temperature measurement circuit 210 may be implemented with a constant current source 214 coupled to a load 212. The constant current source 214 may generate a current I independent of the temperature T and temperature variations. The constant current source 214 may be, for example, based on a bandgap voltage (which is constant over a temperature range). The voltage at the node $N_{TEMP}$ may be generated with the current I flowing through the load 212. The load 212 may have a linear temperature coefficient over a desired temperature range. As is known by a person of ordinary skill in the art, materials such as polysilicon and certain types of metal having such properties may be utilized for the load 212. In such fashion, the voltage at the node $N_{TEMP}$ may be linearly proportional to the temperature T.

The ADC 220 may receive the voltage at the node $N_{TEMP}$ and output a digital value. Various designs for ADC 220 are known in the art and may be used in the temperature sensor 200. In one configuration, the ADC 220 may be a voltage-controlled-oscillator (VCO) based ADC. The ADC 220 may include a VCO 222 and a counter 224. The VCO 222 may output an oscillating signal at the node $N_{CTR}$ for the counter 224. The oscillating signal may oscillate at a frequency proportional to the voltage at the node $N_{TEMP}$. The counter 224 may count the oscillation and output the count as ADC-OUT, which may be the digital representation of the voltage at the node $N_{TEMP}$ (and therefore, of the temperature T).

The temperature sensor 200 may be enabled periodically by the signal SAMPLING_RATE_CTL. Thus, the power consumption and the accuracy of the temperature sensor 200 may be based on the sampling rate controlled by the signal SAMPLING_RATE_CTL. For example, if the sampling rate is high, then the temperature sensor 200 may be enabled more often to produce more accurate results, but consume more power. If the sampling rate is low, then the output ADC-OUT of the temperature sensor 200 may produce less accurate results, but consume less power. The accuracy of the temperature sensor 200 may be further controlled by adjusting the resolution of the ADC 220. For example, the signal BIT_CTL may control the number of the bits of the output ADC-OUT (e.g., adjust the bit number of the counter 224). The more bits outputted, the higher the resolution of the ADC 220 (at the expense of more power consumption). In this fashion, the temperature sensor 200 may be configured by the adjustable accuracy setting controlled by the signals SAMPLING_RATE_CTL and BIT_CTL. The controller 102 may output the signals SAMPLING_RATE_CTL and BIT_CTL to adjust the accuracy settings of the temperature sensor 200.

Figure 3:
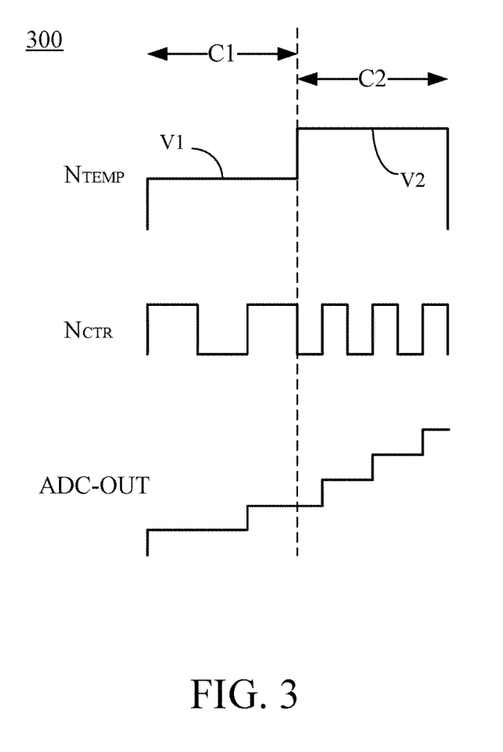
FIG. 3 is a diagram of the waveforms of an operation of the temperature sensor of FIG. 2.

FIG. 3 is a diagram of the waveforms of an operation of the temperature sensor of FIG. 2. The diagram 300 illustrates cycles C1 and C2. The temperature T is lower in the cycle C1 than in the cycle C2. Thus, the voltage at the node $N_{TEMP}$, V1, for the cycle C1 may be lower than the voltage at the node $N_{TEMP}$, V2, for the cycle C2. In response, the VCO 222 may output two oscillating cycles at the node $N_{CTR}$ in the cycle C1 and output three oscillation cycles at the node $N_{CTR}$ in the cycle C2. The counter 224 may count the oscillating cycles and increment the output ADC-OUT. Thus, the output ADC-OUT may be incremented twice in the cycle C1 and three times in the cycle C2. In such fashion, the output ADC-OUT may digitally represent the temperature T in the cycle C1 and the cycle C2.

Figure 4:
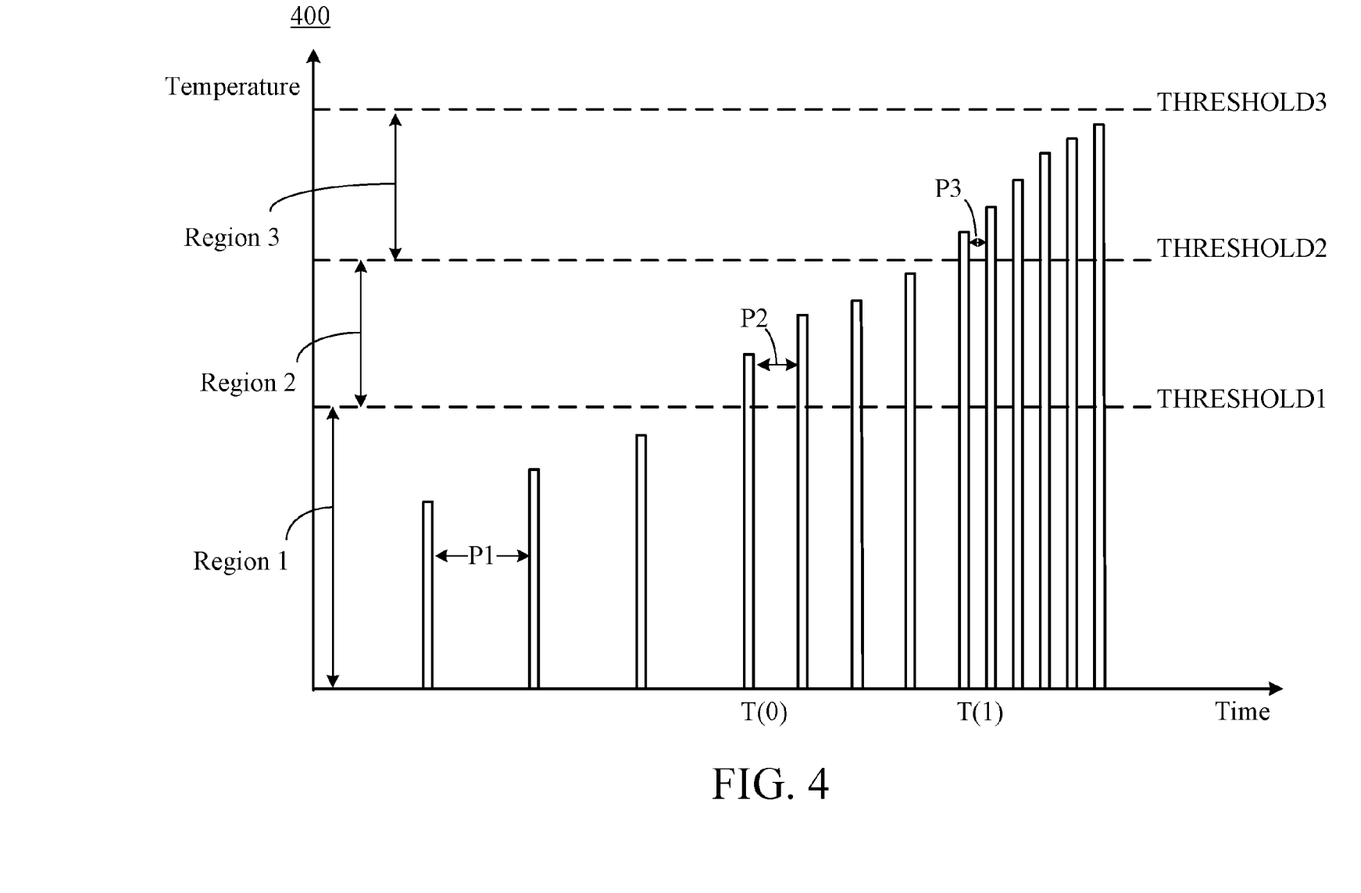
FIG. 4 is a diagram of an accuracy setting adjustment of the temperature sensor of FIG. 2.

FIG. 4 is a diagram of an accuracy setting adjustment of the temperature sensor of FIG. 2. The diagram 400 illustrates temperatures (y-axis) measured by the temperature sensor 200 vs. time (x-axis). The temperature sensor 200 may operate in multiple regions based on ranges of temperatures measured. For example, Region 1 may include the temperature range up to the threshold THRESHOLD1. Region 2 may include the temperature range between the thresholds THRESHOLD1 and THRESHOLD2. Region 3 may include the temperature range between the thresholds THRESHOLD2 and THRESHOLD3.

Prior to time T(0), the temperatures of the circuit 230 measured by the temperature sensor 200 may stay below the threshold THRESHOLD1. Due to the relative low temperatures in this region, the accuracy demands (e.g., to mitigate the heat increase) may be low. The controller 102 thus may adjust the accuracy setting of the temperature sensor 200, in terms of a sampling rate, to a sampling period of P1. (The resolution of the ADC 220 may likewise be adjusted to a few bits. Sampling rate is discussed as an example of accuracy setting adjustment.) The controller 102 may adjust the accuracy setting via the signals SAMPLING_RATE_CTL and/or BIT_CTL.

At time T(0), the temperature measured by the temperature sensor 200 may be detected to exceed the threshold THRESHOLD1. In this region, because of the higher temperatures of the circuit 230 measured by the temperature sensor 200, higher accuracy of the temperature sensor 200 may be needed to monitor the temperatures for potential heat increase. In response, the controller 102 may adjust the accuracy setting of the temperature sensor 200, in terms of a sampling rate, to a sampling period of P2. The sampling period P2 is less than the sampling period P1 (the sampling rate of the Region 2 is greater than the sampling rate of the Region 1).

At time T(1), the temperature measured by the temperature sensor 200 may be detected to exceed the threshold THRESHOLD2, approaching the threshold THRESHOLD3. In this region, because of the higher temperatures of the circuit 230 measured by the temperature sensor 200, higher accuracy of the temperature sensor 200 may be needed to monitor the temperatures for potential heat increase. In some examples, the threshold THRESHOLD3 may be a critical temperature (e.g., a thermal ceiling at which the circuit 230 should not operate). The controller 102 thus may adjust the accuracy setting of the temperature sensor 200, in terms of a sampling rate, to a sampling period of P3. The sampling period P3 is less than the sampling period P2 (the sampling rate of the Region 3 is greater than the sampling rate of the Region 2). In the fashion described above, the accuracy setting of the temperature sensor 200 may be dynamically and adaptively adjusted to tailor to the needs of thermal mitigation. The power consumption of the temperature sensor 200 may accordingly be reduced in the periods when the heat increase is not significant (e.g., Region 1).

As presented above, the temperature sensor 200 may be configured with multiple accuracy settings to measure the temperature T (e.g., a physical parameter) in multiple regions (e.g., Region 1, Region 2, and Region 3). The multiple regions may be based on the temperatures and ranges of the temperatures measured. The controller 102 may set or adjust the accuracy setting (e.g., a sampling rate or resolution) for each of the multiple regions Region 1, Region 2, and Region 3.

However, various drawbacks may arise from the dynamic adjustment of the sensor accuracy setting because measurement information may be lost due to the relaxation of the sensor accuracy setting. For example, other factors or events may arise to cause heat increase conditions to go undetected in the relaxed sensor accuracy setting (e.g., Region 1 or Region 2). Accordingly, a scheme to improve on the dynamic sensor accuracy setting adjustment is desirable.

Figure 5:
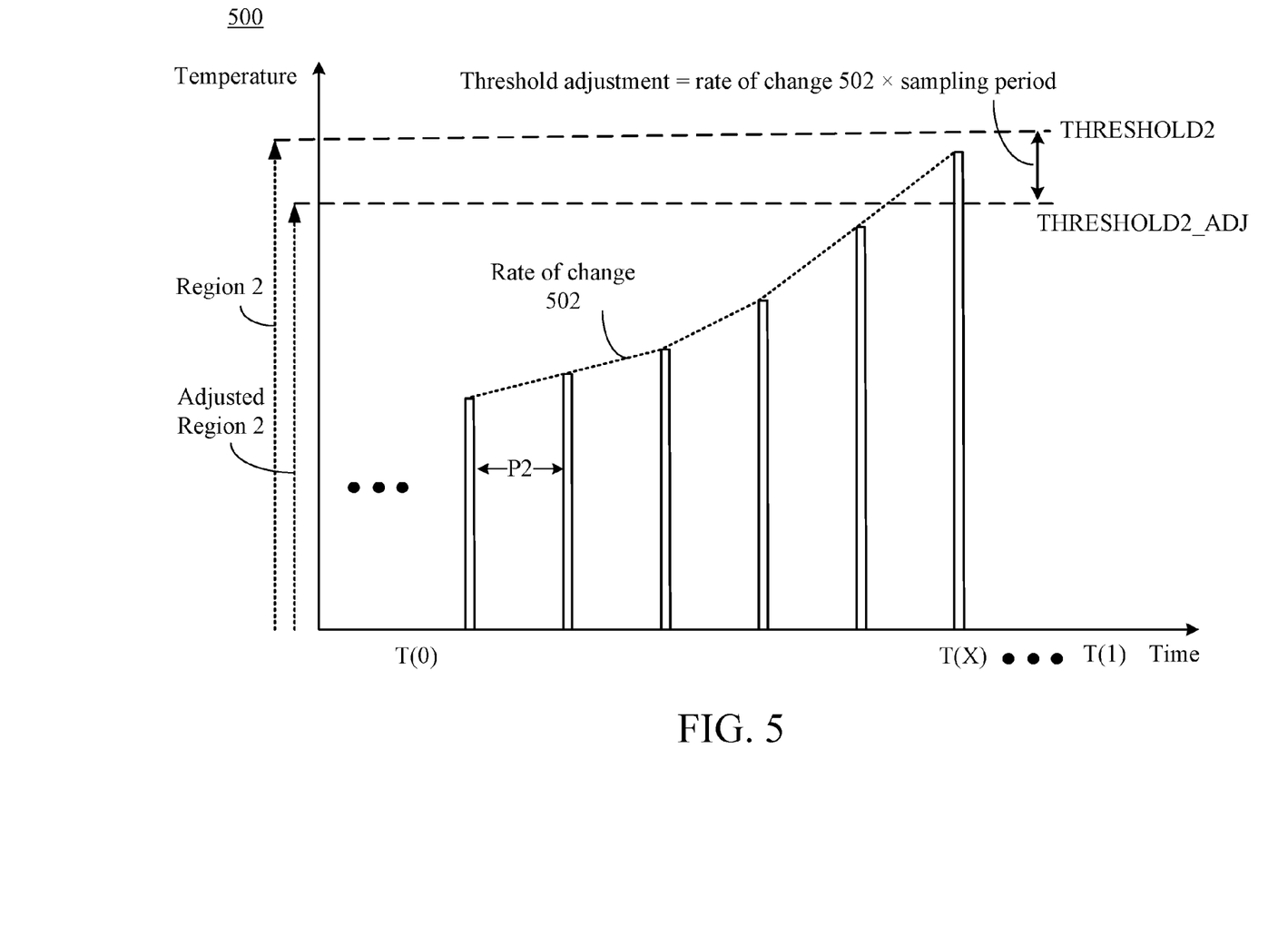
FIG. 5 is a diagram of one example of a scheme to adjust a threshold for sensor accuracy setting adjustment.

Various aspects of apparatuses and methods to adjust the sensor accuracy setting and further to adjust the thresholds for the accuracy setting adjustment are presented herein. In one implementation, the thresholds may be adjusted under certain conditions to help detect the heat generated by the IC in a different fashion (e.g., detecting a temperature rise earlier). FIG. 5 is a diagram of one example of a scheme to adjust a threshold for a sensor accuracy setting adjustment. The diagram 500 illustrates temperatures (y-axis) measured by the temperature sensor 200 vs. time (x-axis). The diagram 500 depicts the temperature sensor 200 operating after time T(0) (e.g., in the Region 2 having the sampling period P2). In some examples, certain events may take place to change the heat-increase landscape. For example, changes of the operating voltage, the operating mode or the workload of the IC 100 (e.g., of the circuit 230) may cause the threshold THRESHOLD2 to become a thermal ceiling. For example, a rise of the operating voltage of the circuit 230 may cause more power to be consumed by the circuit 230, leading to faster increase of the temperature T. A rise of the workload of the circuit 230 may lead to a higher operating voltage and/or operating frequency, both of which may cause the temperature T to rise faster. In some examples, a change of the operating mode of the circuit 230 may also lead to faster increase of the temperature T. For example, the circuit 230 may be changed from a power-saving mode to a performance mode, which may consume more power and lead to a faster rise of temperature T. However, the temperature sensor 200 operating in Region 2 (and the corresponding accuracy setting) may not be able to detect the temperature T in time to mitigate the heat increase caused by these changes.

In one implementation, the controller 102 may adjust the threshold from the base THRESHOLD2 to the threshold THRESHOLD2_ADJ to allow an earlier detection of a rise in temperature. (E.g., adjust the Region 2 to the adjusted Region 2.) In one example, the controller 102 may determine a rate of change 502 of the previously measured temperatures. A threshold adjustment amount may correspond to threshold adjustment=rate of change×sampling period, where the sampling period is P2 in this example. As illustrated in FIG. 5, the adjusted threshold THRESHOLD2_ADJ may allow a detection at a time T(X) prior to the time T(1). In other words, the temperature sensor 200 might fail to detect the temperature approaching or even exceeding the previous threshold THRESHOLD2 without the threshold adjustment. In such fashion, the IC 100 may act to mitigate or reduce the heat generated before the temperature of the IC 100 approaches or exceeds the threshold THRESHOLD2.

FIG. 5 illustrates one example of a scheme to adjust the threshold based on a base threshold, which is a preset threshold, such as THRESHOLD2, to adjust the sensor accuracy setting. Other schemes are applicable. In one example, the controller 102 may receive information regarding the operating voltage of the circuit 230. In response, the controller 102 may adjust the thresholds based on the base thresholds (e.g., THRESHOLD1, THRESHOLD2, and THRESHOLD3). For example, if the operating voltage is raised, heat may be generated faster by the circuit 230. Accordingly, the controller 102 may adjust the thresholds lower from the base thresholds to respond to the heat generation sooner, as presented above. In another example, the controller 102 may take into account the time to mitigate heat increase in the current temperature range when adjusting the thresholds. For example, if mitigating the heat increase at the threshold THRESHOLD2 requires a time $T_{MITIGATE}$, the controller 102, based on the current operating region (or the current accuracy setting), may adjust the threshold THRESHOLD2 to ensure enough time for $T_{MITIGATE}$.

Figure 6:
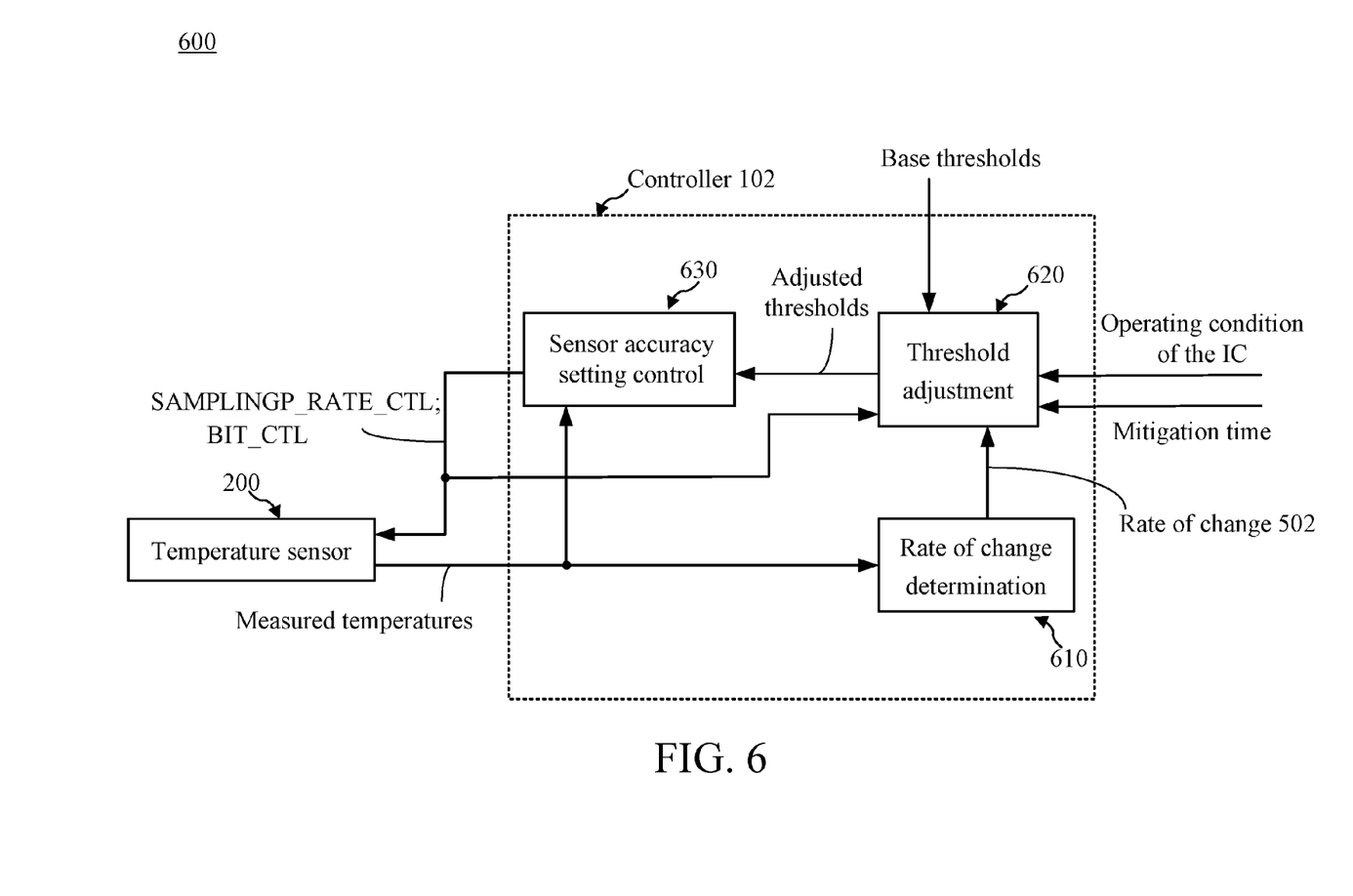
FIG. 6 is a diagram of an exemplary embodiment of a controller to adjust a threshold for sensor accuracy setting adjustment.

FIG. 6 is a diagram of an exemplary embodiment of a controller to adjust a threshold for sensor accuracy setting adjustment. The diagram 600 includes the temperature sensor 200 and the controller 102. These apparatus and methods will be described in the following description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, DSP, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

The temperature sensor 200, as presented with FIG. 2, provides an example of a sensor configured with an adjustable accuracy setting to measure a physical parameter. The physical parameter may be a voltage or a temperature measured by the temperature sensor 200. The accuracy setting may a setting to change a sampling rate or resolution of the temperature sensor 200.

The controller 102 includes a rate of change determination component 610, a threshold adjustment component 620, and a sensor accuracy setting control component 630. The controller 102 may be configured to adjust the accuracy setting (e.g., sampling rate and/or resolution) based on a threshold, and to adjust the threshold based on certain conditions. For example, such conditions may include at least one physical parameter (e.g., voltage or temperature) measured by the temperature sensor 200 or a change of operating condition of the circuit 230. The rate of change determination component 610 receives the measured temperatures from the temperature sensor 200. Referring to FIG. 5, the rate of change determination component 610 may determine the rate of change 502 (e.g., a slope) from the previously received temperatures. The rate of change 502 is provided to the threshold adjustment component 620.

The threshold adjustment component 620, in addition to the rate of change 502, receives the current accuracy setting (e.g., signals SAMPLING_RATE_CTL and BIT_CTL), the base thresholds, the operating condition of the IC, and the mitigation time. The temperature sensor 200 may detect or measure the temperature T, which is based on or generated by the operation of the circuit 230. Referring to FIG. 4, the base thresholds may be the preset thresholds THRESHOLD1, THRESHOLD2, and THRESHOLD3. The operating condition of the IC may include, for example, the operating voltage, the operating mode, and the workload of the circuit 230. The change of the operating condition of the IC (e.g., circuit 230) may cause the heat generation to accelerate.

In one implementation, as described above, the temperature sensor 200 may be configured with multiple accuracy settings (e.g., an adjust setting to change the sampling rates and/or resolutions) to measure the temperature T (e.g., physical parameter) of a circuit 230 in a multiple of operating regions. For example, referring to FIG. 4, the temperature sensor 200 may operate in the regions: Region 1, Region 2, Region 3. The accuracy setting of the temperature sensor 200 may be different for each of the regions. For example, the temperature sensor 200 may measure the temperature T using the sampling period P1 in the Region 1, the sampling period P2 in the Region 2, and the sampling period P3 in the Region 3. In some examples, the accuracy setting may correspond to the resolution setting (e.g., number of bits of ADC-OUT of FIG. 3). For example, the temperature sensor 200 may measure the temperature T using a resolution of X1 bits in the Region 1, X2 bits in the Region 2, and X3 bits in Region 3. In some examples, X1, X2, and X3 may be different. For example, X3>X2>X1, such that the resolution is higher as the temperature T rises.

Each of the regions is based on or defined by a range of temperatures of the circuit 230. For example, the Region 1 corresponds to the temperature range below the threshold THRESHOLD1. The Region 2 corresponds to the temperature range between the threshold THRESHOLD1 and the threshold THRESHOLD2. The Region 3 corresponds to the temperature range above the threshold THRESHOLD2. The threshold adjustment component 620 may be configured to adjust one of the temperature ranges of the operating regions, in response to a change of an operating condition of the IC 100 (e.g., circuit 230), as presented in FIG. 5.

For example, an increase of the operating voltage, operating mode, or the workload may forecast an accelerated rise of the temperature T in the subsequent time period. For example, changing the operating mode may include switching to a high performance or high frequency mode, which may cause an accelerated rise of the temperature T. An increase in the operating voltage and the workload of the IC 100 (e.g., circuit 230) may similarly accelerate the rise of the temperature T. The threshold adjustment component 620 may thus adjust the base thresholds to account for the change of the heat generation pattern. Referring to FIG. 5, an example of the threshold adjustment may be threshold adjustment=rate of change×sampling period.

Moreover, the threshold adjustment component 620 may take the mitigation time (e.g., $T_{MITIGATE}$) into account. The mitigation time $T_{MITIGATE}$ may be a time needed to mitigate a heat increase based on the current temperature range. The threshold adjustment component 620 may adjust the thresholds to make sure that a detection of the heat increase would allow enough time to mitigate the increase.

The threshold adjustment component 620 outputs the adjusted thresholds to the sensor accuracy setting control component 630. Referring to FIG. 5, the threshold adjustment component 620 may detect whether a temperature measured by the temperature sensor 200 exceeds the adjusted thresholds, and output the signals SAMPLING_RATE_CTL and/or BIT_CTL to the temperature sensor 200 to adjust the accuracy setting thereof. For example, the signal SAMPLING_RATE_CTL may adjust the sampling rate (e.g., sampling period P1, P2, or P3) of the temperature sensor 200. The signal BIT_CTL may adjust the resolution (e.g., bits X1, X2, or X3) of the temperature sensor 200. Referring to FIG. 5, for example, the sensor accuracy setting control component 630 may set or adjust the temperature sensor 200 to measure the temperature T at the sampling period P2 via the signal SAMPLING_RATE_CTL (or to measure the temperature T at a resolution of X2 bits via the signal BIT_CTL). In response to the temperature T exceeding the threshold THRESHOLD2 or THRESHOLD2_ADJ, the sensor accuracy setting control component 630 may set or adjust the temperature sensor 200 to measure the temperature T at the sampling period P3 via the signal SAMPLING_RATE_CTL (or to measure the temperature T at a resolution of X3 bits via the signal BIT_CTL).

In the fashion described above, the controller 102 may be configured to adjust the thresholds (which are used to adjust the accuracy setting of the temperature sensor 200) based on a rate of change 502 of the measured temperatures. The controller 102 may be further configured to adjust the thresholds based on a base threshold (e.g., THRESHOLD1, THRESHOLD2, or THRESHOLD3). The controller 102 may be further configured to adjust the thresholds based on a current accuracy setting of the sampling rate (e.g., the sampling period) and/or the resolution. The controller 102 may be further configured to adjust the thresholds based on or in response to a change of an operating condition (e.g., an operating voltage, an operating mode, or workload) of the IC 100 (e.g., the circuit 230).

Figure 7:
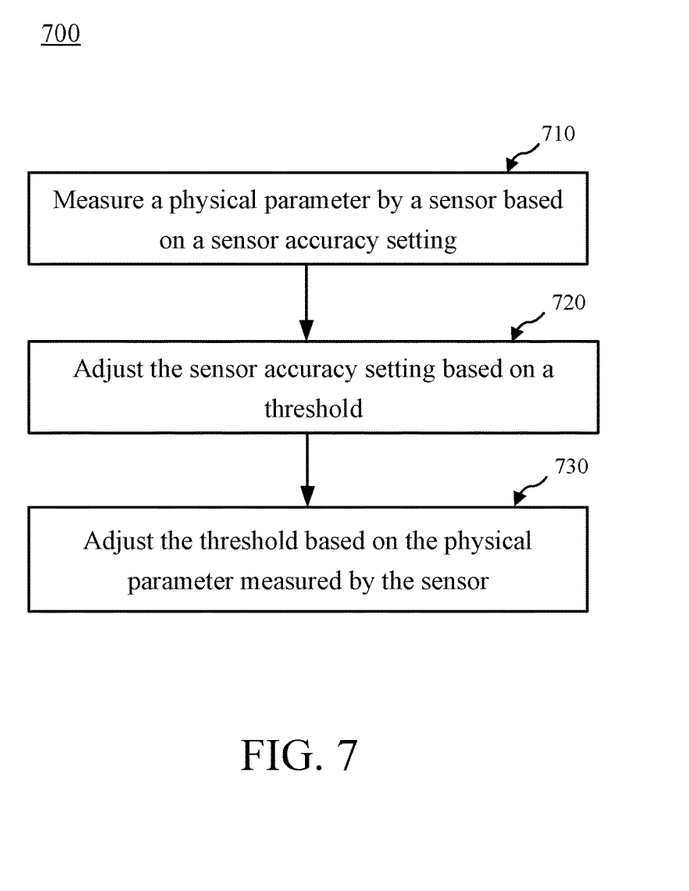
FIG. 7 is a flowchart of a method to operate the controller of FIG. 6 for measuring a temperature.

FIG. 7 is a flowchart of a method to operate the controller of FIG. 6 for measuring a temperature. At 710, a physical parameter is measured by a sensor. Referring to FIG. 6, the temperature sensor 200 may measure the temperature T, which is based on (e.g., generated by) the operations of the circuit 230. Referring to FIG. 1, for example, the temperature sensor 200 may correspond to the temperature sensor 3, which is placed near the WLAN component to measure the temperature generated therefrom. Referring to FIG. 2, the temperature sensor 200 may measure the temperature T based on the sensor accuracy setting. For example, the sensor accuracy setting may be the sampling rate controlled by the signal SAMPLING_RATE_CTL or resolution controlled by the signal BIT_CTL.

At 720, the sensor accuracy setting is adjusted, based on a threshold. Referring to FIGS. 2 and 4, at the time T(0), the measured temperature may exceed the threshold THRESHOLD1. The controller 102 may in response adjust the sampling rate (e.g., change the sampling period from P1 to P2) via the signal SAMPLING_RATE_CTL. In some examples, the controller 102 may in response adjust the resolution of the temperature sensor 200 via the signal BIT_CTL.

At 730, the threshold is adjusted based on the physical parameter measured by the sensor. Referring to FIG. 5, the controller 102 may adjust the threshold from the base THRESHOLD2 to the threshold THRESHOLD2_ADJ to allow an earlier detection of a heat increase condition. In one example, the controller 102 may determine a rate of change 502 of the previously measured temperatures. A threshold adjustment amount may correspond to $$\text{threshold adjustment} = \text{rate of change} \times \text{sampling period},$$

where the sampling period is P2 in this example. As illustrated in FIG. 5, the adjusted threshold THRESHOLD2_ADJ may allow a detection at a time T(X) prior to the time T(1).

Referring to FIG. 5, a threshold may be adjusted based on a base threshold (e.g., preset thresholds such as the THRESHOLD2), and the threshold may be used to adjust the sensor accuracy setting. Other schemes are contemplated. In one example, the controller 102 may receive information regarding the operating voltage of the circuit 230. In response, the controller 102 may adjust the thresholds based on the base thresholds (e.g., THRESHOLD1, THRESHOLD2, and THRESHOLD3). For example, if the operating voltage is raised, heat may be generated faster by the circuit 230. Accordingly, the controller 102 may adjust the thresholds lower from the base thresholds to respond to the heat generation quicker. In another example, the controller 102 may take the time to mitigate heat increase in the current temperature range into account when adjusting the thresholds. For example, if mitigating the heat increase at the threshold THRESHOLD2 requires a time $T_{MITIGATE}$, the controller 102, based on the current operating region (or the current accuracy setting), may adjust the threshold THRESHOLD2 to allow for $T_{MITIGATE}$.

In the fashion described above, the controller 102 may be configured to adjust the thresholds (which is used to adjust the accuracy setting of the temperature sensor 200) based on a rate of change 502 of the measured temperatures. The controller 102 may be further configured to adjust the thresholds based on a base threshold (e.g., THRESHOLD1, THRESHOLD2, or THRESHOLD3). The controller 102 may be further configured to adjust the thresholds based on a current accuracy setting of the sampling rate (e.g., the sampling period). The controller 102 may be further configured to adjust the thresholds based on an operating condition (e.g., an operating voltage, an operating mode, or workload) of the circuit 230.

Figure 8:
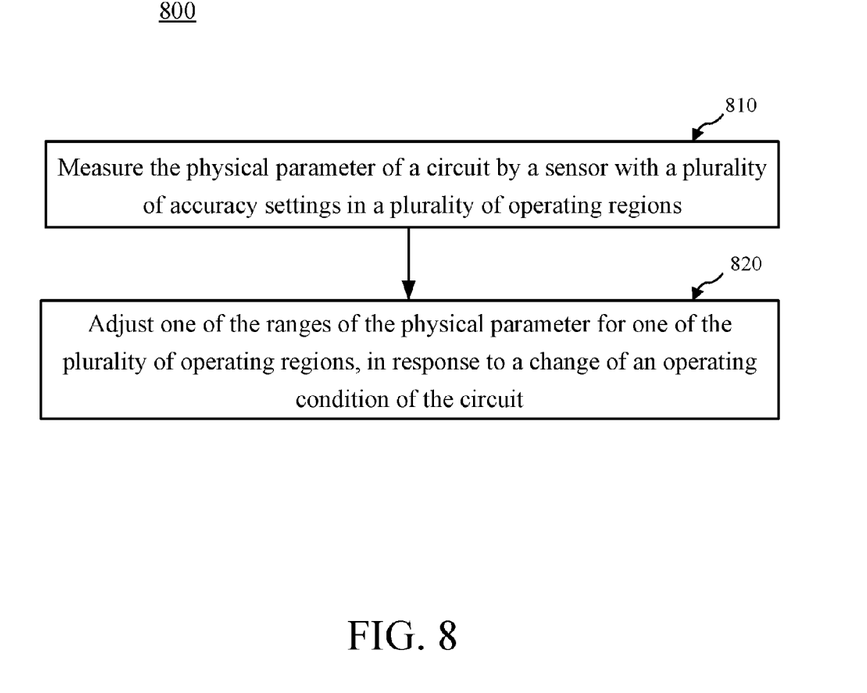
FIG. 8 is a flowchart of another method to operate the controller of FIG. 6 for measuring a temperature.

FIG. 8 is a flowchart of another method to operate the controller of FIG. 6 for measuring a temperature. At block 810, the physical parameter of a circuit is measured by a sensor with a plurality of accuracy settings in a plurality of operating regions. For example, referring to FIGS. 5 and 6, the temperature sensor 200 may be configured with multiple accuracy settings (e.g., to control or change the sampling rates and/or resolutions) to measure the temperature T (e.g., physical parameter) of a circuit 230 in a multiple of operating regions. For example, referring to FIG. 4, the temperature sensor 200 may operate in the regions Region 1, Region 2, Region 3. The accuracy setting of the temperature sensor 200 may differ for each of the regions. For example, the temperature sensor 200 may measure the temperature T using the sampling period P1 in Region 1, the sampling period P2 in Region 2, and the sampling period P3 in Region 3. Each of the regions is based on or defined by a range of temperatures of the circuit 230. For example, Region 1 corresponds to the temperature range below the threshold THRESHOLD1. Region 2 corresponds to the temperature range between the threshold THRESHOLD1 and the threshold THRESHOLD2. Region 3 corresponds to the temperature range above the threshold THRESHOLD3.

At block 820, one of the ranges of the physical parameter for one of the plurality of operating regions is adjusted, in response to a change of an operating condition of the circuit. For example, the threshold adjustment component 620 may be configured to adjust one of the temperature ranges of the operating regions, in response to an interrupt such as a change of an operating condition of the IC 100 (e.g., circuit 230). The operating condition of the circuit may be an operating voltage, an operation mode, or a workload. For example, referring to FIG. 5, the threshold adjustment component 620 may adjust the temperature range of the Region 2 to the adjusted Region 2 by adjusting the threshold from the base threshold THRESHOLD2 to the THRESHOLD_ADJ. The adjustment may be based on the rate of change 502 and the accuracy setting of the region (e.g., the sampling rate).

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. An apparatus, comprising:
 a sensor configured with an adjustable accuracy setting to measure a physical parameter; and
 a controller configured to adjust the accuracy setting to change a sampling rate or resolution of the sensor based on a threshold associated with the physical parameter, and to adjust the threshold based on the physical parameter measured by the sensor.

2. The apparatus of claim 1, wherein the physical parameter comprises a voltage or a temperature.

3. The apparatus of claim 1, wherein the physical parameter is based on an operation of a circuit, and wherein the controller is configured to adjust the threshold based on an operating condition of the circuit.

4. The apparatus of claim 3, wherein the operating condition of the circuit comprises one of an operating voltage, an operation mode, or a workload.

5. The apparatus of claim 1, wherein the controller is configured to adjust the threshold based on a rate of change of the physical parameter measured by the sensor.

6. The apparatus of claim 5, wherein the controller is further configured to adjust the threshold by adjusting a preset threshold associated with the physical parameter.

7. The apparatus of claim 6, wherein the controller is further configured to adjust the threshold based on a current accuracy setting of the sampling rate.

8. A method for measuring a physical parameter, comprising:
- measuring the physical parameter using a sensor having an adjustable accuracy setting;
- adjusting the accuracy setting to change a sampling rate or resolution of the sensor based on a threshold associated with the physical parameter; and
- adjusting the threshold based on the physical parameter measured by the sensor.

9. The method of claim 8, wherein the physical parameter comprises a voltage or a temperature.

10. The method of claim 8, wherein the physical parameter is based on an operation of a circuit, and wherein the adjusting the threshold is based on an operating condition of the circuit.

11. The method of claim 10, wherein the operating condition of the circuit comprises one of an operating voltage, an operation mode, or a workload.

12. The method of claim 8, wherein the adjusting the threshold is based on a rate of change of the physical parameter measured by the sensor.

13. The method of claim 12, wherein the adjusting the threshold is based on a preset threshold associated with the physical parameter.

14. The method of claim 13, wherein the adjusting the threshold is based on a current accuracy setting.

* * * * *